Dec. 10, 1957         I. SHAPIRO         2,815,575
APPARATUS FOR MEASURING AMPLITUDES OF TRACES
Filed July 2, 1956
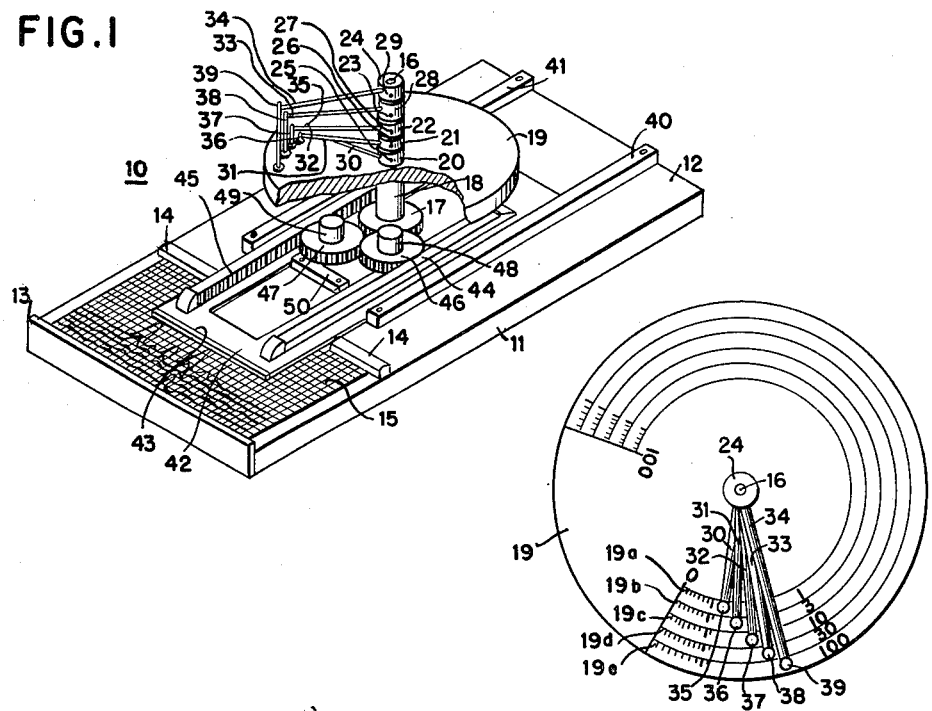
FIG.1
FIG.2
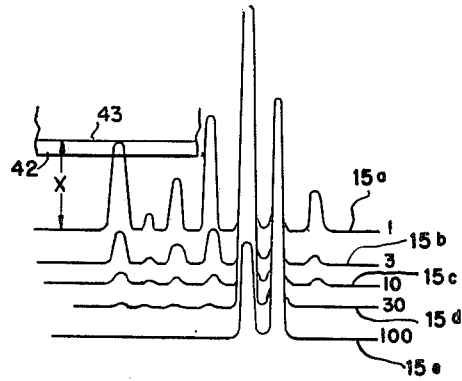
FIG.3
*INVENTOR.*
Isadore Shapiro
BY Adams, Forward & McLean
ATTORNEYS United States Patent Office 2,815,575
Patented Dec. 10, 1957

2,815,575

APPARATUS FOR MEASURING AMPLITUDES OF TRACES

Isadore Shapiro, Pasadena, Calif., assignor, by mesne assignments, to Olin Chemical Co., Inc., a corporation of Delaware Application July 2, 1956, Serial No. 595,403

2 Claims. (Cl. 33—76)

My invention relates to measuring amplitude of traces marked on photographic paper or other sheet materials and in particular provides a reading device to assist in ascertaining the amplitude of any selected peak of any selected trace of a plurality of traces marked along parallel base lines.

In mass spectroscopy where the accelerating potential is increased or decreased as a function of time, such that ions of different mass numbers are sequentially collected, the collected ions are commonly electronically amplified to drive a plurality of mirror galvanometers. A different amplification factor is used for each galvanometer, and the galvanometer traces are usually recorded on a traveling photographic film or paper. The resultant photograph, i. e., mass spectrogram, is a series of traces along parallel base lines with peaks corresponding to the detected mass numbers. Because different amplification factors are employed for the several traces, corresponding peaks will appear with scale heights in accordance with the ratios of amplification factors, and pronounced peaks in the more sensitive traces may often be clipped through overloading the amplifier or galvanometer.

Conveniently, each mass spectrogram must be scanned by hand for each mass number at which a peak occurs. This operation is tedious at best and often difficult because of the clipping which occurs with pronounced peaks in the higher amplification ranges and because some peaks, even in the lowest amplification range tend to ride over the base lines of the other traces. The manual operation is further complicated by the fact that as each peak is measured a correction must be applied to bring the base line of the particular trace into coincidence with a reference line from which the amplitude is measured. It is, moreover, often difficult to keep account of which peaks have been measured, particularly since pronounced peaks will occur in close groups for materials having several abundant isotopes.

It is the principal object of my invention to provide a device to assist in measurement of the amplitude of traces, particularly such as are produced in mass spectroscopy, in which single correction can be made to adjust all base lines to the datum and in which, simply by aligning a straight edge with the top of the peak, the amplitude of the peak can be directly read on a separate scale for the particular trace in which the peak occurs. This object I effectively accomplish by providing a straight edge which is slidable through an infinite series of parallel positions such that it can be aligned at a peak of a trace having a base line parallel to the straight edge and by providing a movable indicator, carrying a series of separate scales of adjustable origin, one for each trace, which is operably connected to the straight edge to move in response to movement of the straight edge.

For a more complete understanding of the principles of my invention, reference is made to the appended drawings in which:

Fig. 1 is an isometric view of a device constructed in accordance with my invention;

Fig. 2 is a plan view of the indicating portion of the device shown in Fig. 1; and Fig. 3 is a sketch of a typical series of traces such as are obtained in a recording mass spectroscope.

Referring to Fig. 1, the reference numeral 10 indicates a reading device which includes a flat base 11 having a coplanar top surface 12 and which at one end is provided with a pair of parallel guides 13 and 14 for positioning a sheet of photographic paper 15 or other sheet material on which traces 15a, 15b, 15c, 15d and 15e to be measured are recorded. Near the center of base 11 and projecting perpendicularly above coplanar surface 12 is a spindle 16 which is affixed at its lower end in base 11. Just above coplanar surface 12 a pinion 17 is coaxially mounted on spindle 16. A sleeve 18, which at its lower end is affixed to pinion 17, is coaxially positioned over spindle 16 and at its upper end is affixed in an indicating disc 19 which is also coaxially positioned on spindle 16. Pinion 17, sleeve 18 and disc 19 rotate freely on spindle 16 as a unit.

Five collars 20, 21, 22, 23 and 24 are mounted over spindle 16 extending in that order above disc 19. Collars 20, 21, 22, 23 and 24 can be affixed to spindle 16 by means of set screws 25, 26, 27, 28 and 29, respectively, and collars 20, 21, 22, 23 and 24 respectively carry radially projecting arms 30, 31, 32, 33 and 34. The outer ends of arms 30, 31, 32, 33 and 34 respectively carry indicating feet 35, 36, 37, 38 and 39 which at their bases cooperate with the upper surface of disc 19.

The upper surface of disc 19 (see also Fig. 2) is inscribed with a series of concentric scales 19a, 19b, 19c, 19d and 19e. Each of arms 30, 31, 32, 33 and 34 is cut to a different length such that foot 35 carried by arm 30 cooperates with the innermost concentric scale 19a; foot 36 carried by arm 31 cooperates with the next innermost scale 19b; and feet 37, 38 and 39 carried respectively by arms 32, 33 and 34 cooperate respectively with middle scale 19c, next outer scale 19d and outermost scale 19e.

Also positioned on coplanar surface 12 of base 11 are a pair of guides 40 and 41 which are parallel to each other, spaced on opposite sides of spindle 16 and extend lengthwise of base 11 perpendicularly to guides 13 and 14. A sensing device 42 which is an open-centered, flat, rectangular plate constructed of transparent material is positioned in sliding contact on coplanar surface 12 of base 11. Plate 42 is provided with a straight edge 43 at one end in the form of a straight line marked transversely across its undersurface. The long edges of plate 42 which are perpendicular to straight edge 43 are slidingly received by guides 40 and 41, and spindle 16 and pinion 17 extend upwardly through the open center of plate 42 clear of its inner perimeter.

On the upper surface of plate 42 are a pair of racks 44 and 45 which are positioned parallel and adjacent to guides 40 and 41, respectively, with their teeth extending inwardly toward the open center of plate 42 confronting each other. A pair of pinions 46 and 47 are rotatively mounted on shafts 48 and 49, respectively, in meshing engagement spaced above the upper surface of plate 42. Shafts 48 and 49 are positioned in base 11 and extend through the open center of plate 42 such that pinion 46 meshes with both pinion 17 and rack 44 as well as pinion 47 and pinion 47, in addition to meshing with pinion 46, also meshes with rack 45.

A small block 50 is secured to base 11 on surface 12 in the open center of plate 42 between pinions 17, 46 and 47 and guide 14 and serves to prevent plate 42, when pushed away from guide 13, from contacting either of pinions 46 or 47. The length of the open center of plate 42 is such that when the end at straight edge 43 contacts guide 13 plate 42 still clears pinion 17. It will be further noted that guide 14 is split to permit passage of sensing device 42 between its ends.

Fig. 3 represents a typical mass spectogram of traces 15a, 15b, 15c, 15d and 15e which are suitably marked on horizontally ruled paper, although for the purposes of my device the ruling can be omitted. It will be noted that trace 15a is considered as being on a unit scale; trace 15b is on a scale with an attenuation factor of three; and similarly scales 15c and 15d and 15e have attenuation factors respectively of ten, thirty and one hundred. Appropriately the scales 19a, 19b, 19c, 19d and 19e of disc 19 have attenuation factors respectively of unity, three, ten, thirty and one hundred.

In operation the sheet of film or paper 15 carrying scales 15a through 15e is placed transversely across surface 12 of base 11 between guides 14 and 13. Plate 42 is then drawn between guide 13 to align straight edge 43 with the base line of trace 15a. Set screw 25 is loosened, and collar 20 is rotated to align foot 35 with the origin of scale 19a. Set screw 25 is then tightened to set this position. This operation is repeated for each of the base lines of traces 15b, 15c, 15d and 15e with scales 19b, 19c, 19d and 19e respectively so that feet 36, 37, 38 and 39 each indicate the origin of their respective scales when straight edge 43 is aligned with the base line of the appropriate trace. The operator then slides paper 15 to a convenient position to begin measuring peaks at one end or the other of the sheet. Referring to Fig. 3, it will be seen that in measuring the first left hand peak sensing plate 42 is drawn toward guide 13 to align straight edge 43 with the peak on trace 15a. The movement in separating straight edge 43 through the distance X from the base line of trace 15a to the top of the left end peak in that trace through racks 44 and 45 and pinions 46, 47 and 17 rotates disc 19 relative to arm 30 and foot 35 to cause foot 35 to indicate on scale 19a the amplitude of the selected peak. This measurement is then noted, and the operation is repeated on the corresponding peak in trace 15b reading the resultant measurement on scale 19b and so on through traces where the peak is measurable. The same operation is repeated for each set of corresponding peaks across the length of sheet 15.

It will be apparent that the measuring device of my invention greatly reduces the time required in interpreting records from mass spectrographs and at the same time reduces the likelihood of error and facilitates accurate reading of the peaks.

I claim:

1. A reading device for measuring amplitude of a plurality of traces made along parallel base lines on sheet material which comprises a base member having a coplanar surface for receiving at one end thereof a flat sheet having marked thereon a plurality of traces made along parallel base lines extending transversely of said base member, an indicating disc rotatively mounted above the coplanar surface of said base member, said disc having marked thereon a plurality of concentric scales, a plurality of indicating arms separately affixed above said disc in predetermined angular positions relative thereto, the end of each said arm cooperating with one of said scales, a sensing device longitudinally slidable over the coplanar surface of said base member, and a straight measuring line transversely positioned on said sensing device, said sensing device being operatively connected to said disc whereby the angular position of said disc is responsive to the longitudinal position of said sensing device.

2. A reading device for measuring amplitude of a plurality of traces made along parallel base lines on sheet material which comprises a base member having a coplanar surface for receiving at one end thereof a flat sheet having marked thereon a plurality of traces made along parallel base lines extending transversely of said base member, a spindle affixed at one end thereof in said base member and projecting therefrom perpendicularly to the coplanar surface thereof, an indicating disc rotatively mounted on said spindle above the coplanar surface of said base member, said disc having marked thereon a plurality of concentric scales, a plurality of indicating arms separately affixed to said spindle above said disc in predetermined angular positions relative thereto, the end of each said arm remote from said spindle cooperating with one of said scales, a sensing device longitudinally slidable over the coplanar surface of said base member, and a straight measuring line transversely positioned on said sensing device, said sensing device being operatively connected to said disc whereby the angular position of said disc is responsive to the longitudinal position of said sensing device.

References Cited in the file of this patent
UNITED STATES PATENTS

| | | |
|---|---|---|
| 2,252,535 | West et al. | Aug. 12, 1941 |
| 2,515,954 | Dyczynski et al. | July 18, 1950 |
| 2,533,649 | Warner | Dec. 12, 1950 |
| 2,586,430 | Keller | Feb. 19, 1952 |